United States Patent
Adelmann et al.

(10) Patent No.: US 8,617,497 B2
(45) Date of Patent: Dec. 31, 2013

(54) MIXED OXIDE MATERIALS FOR THE SELECTIVE CATALYTIC REDUCTION OF NITROGEN OXIDES IN EXHAUST GASES

(75) Inventors: Katja Adelmann, Darmstadt (DE); Gerald Jeske, Neuberg (DE); Rainer Domesle, Alzenau-Kaelberau (DE); Nicola Soeger, Nidderau (DE); Michael Seyler, Rodenbach (DE); Anke Schuler, Woerth (DE); Thomas R. Pauly, Oberursel (DE); Barry W. L. Southward, Bristol, PA (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/642,048

(22) PCT Filed: Apr. 16, 2011

(86) PCT No.: PCT/EP2011/001944
§ 371 (c)(1),
(2), (4) Date: Dec. 13, 2012

(87) PCT Pub. No.: WO2011/131324
PCT Pub. Date: Oct. 27, 2011

(65) Prior Publication Data
US 2013/0121902 A1 May 16, 2013

(30) Foreign Application Priority Data
Apr. 20, 2010 (EP) .................................. 10004198

(51) Int. Cl.
*B01D 53/56* (2006.01)
*B01D 53/94* (2006.01)
*B01J 21/06* (2006.01)
*B01J 23/10* (2006.01)
*B01J 29/00* (2006.01)

(52) U.S. Cl.
USPC .................. 423/213.2; 423/239.1; 423/239.2; 60/299; 502/302; 502/73; 502/65

(58) Field of Classification Search
USPC .................. 423/239.1, 239.2, 213.2; 60/299; 502/302, 73, 65
See application file for complete search history.

(56) References Cited

U.S. PATENT DOCUMENTS

| | | | |
|---|---|---|---|
| 4,782,039 A | 11/1988 | Lindsey | |
| 4,854,123 A | 8/1989 | Inoue | |
| 4,961,917 A | 10/1990 | Byrne | |
| 5,057,483 A * | 10/1991 | Wan | 502/304 |
| 5,552,128 A | 9/1996 | Chang et al. | |
| 5,898,014 A * | 4/1999 | Wu et al. | 502/302 |
| 6,468,941 B1 | 10/2002 | Bortun et al. | |
| 6,713,031 B2 | 3/2004 | Harris et al. | |
| 6,843,971 B2 | 1/2005 | Schäfer-Sindlinger et al. | |
| 6,914,026 B2 | 7/2005 | Tran et al. | |
| 7,220,692 B2 * | 5/2007 | Marshall et al. | 502/60 |
| 7,332,148 B2 | 2/2008 | Tran et al. | |
| 8,187,995 B2 * | 5/2012 | Wakita et al. | 502/304 |
| 8,337,791 B2 * | 12/2012 | Kohara et al. | 423/213.2 |
| 2005/0196333 A1 | 9/2005 | Schäfer-Sindlinger et al. | |
| 2006/0228283 A1 | 10/2006 | Malyala et al. | |
| 2008/0095682 A1 | 4/2008 | Kharas et al. | |
| 2009/0215613 A1 * | 8/2009 | Hagemeyer | 502/304 |
| 2010/0034717 A1 | 2/2010 | Adelmann et al. | |
| 2010/0111793 A1 | 5/2010 | Mori et al. | |
| 2010/0209327 A1 | 8/2010 | Soeger et al. | |
| 2011/0146237 A1 | 6/2011 | Adelmann et al. | |
| 2013/0210617 A1 * | 8/2013 | Hernandez et al. | 502/242 |

FOREIGN PATENT DOCUMENTS

| | | |
|---|---|---|
| EP | 0 246 859 A1 | 11/1987 |
| EP | 0 277 765 A1 | 8/1988 |
| EP | 0 385 164 A2 | 9/1990 |
| EP | 1 147 801 A1 | 10/2001 |
| EP | 1 153 648 A1 | 11/2001 |
| EP | 1 495 804 A1 | 1/2005 |
| EP | 2 072 120 A1 | 6/2009 |
| EP | 2 116 293 A1 | 11/2009 |
| WO | 2008/006427 A1 | 1/2008 |
| WO | 2008/049491 A1 | 5/2008 |
| WO | 2008/051752 A2 | 5/2008 |

OTHER PUBLICATIONS

International Search Report for PCT/EP2011/001944 mailed Aug. 12, 2011 (in English).
PCT Notification Concerning Transmittal of International Preliminary Examination Report on Patentability (Form PCT/IB/326) dated Nov. 1, 2012 for Application No. PCT/EP2011/001944 (in English).
PCT International Preliminary Report on Patentability (Form PCT/IB/373) mailed Oct. 23, 2012 for Application No. PCT/EP2011/001944 (in English).
English translation of the PCT Written Opinion of the International Searching Authority (Form/ISA/237) mailed Oct. 23, 2012 for Application No. PCT/EP2011/001944 (in English).

* cited by examiner

*Primary Examiner* — Timothy Vanoy
(74) *Attorney, Agent, or Firm* — Smith, Gambrell & Russell, LLP (57) ABSTRACT

The invention relates to the use of mixed oxides made of cerium oxide, zirconium oxide, rare earth sesquioxide and niobium oxide as catalytically active materials for the selective catalytic reduction of nitrogen oxides with ammonia or a compound that can decompose to form ammonia in the exhaust gas of internal combustion engines in motor vehicles that are predominantly leanly operated, and to compositions or catalysts which contain said mixed oxides in combination with zeolite compounds and/or zeolite-like compounds and are suitable for the denitrogenation of lean motor vehicle exhaust gases in all essential operating states.

12 Claims, 6 Drawing Sheets a)

MIXED OXIDE MATERIALS FOR THE SELECTIVE CATALYTIC REDUCTION OF NITROGEN OXIDES IN EXHAUST GASES

The invention relates to the use of mixed oxides as catalytically active material for the selective catalytic reduction of nitrogen oxides by means of ammonia or a compound which can be decomposed to form ammonia as reducing agent in the exhaust gas of internal combustion engines operated under predominantly lean conditions in motor vehicles. The invention additionally relates to catalytically active compositions comprising a mixed oxide and a zeolite compound and/or a zeolite-like compound, and also various embodiments of catalysts produced from the abovementioned mixed oxides or compositions.

Exhaust gases from vehicles having an internal combustion engine operated under predominantly lean conditions contain not only the usual primary emissions carbon monoxide CO, hydrocarbons HC and nitrogen oxides $NO_x$ but also have a relatively high oxygen content of up to 15% by volume. Carbon monoxide and hydrocarbons can easily be rendered undamaging by oxidation. The reduction of the nitrogen oxides to nitrogen is more difficult because of the high oxygen content.

A known method of removing nitrogen oxides from exhaust gases in the presence of oxygen is the process of selective catalytic reduction (SCR process) by means of ammonia over a suitable catalyst, referred to as SCR catalyst for short. In this process, the nitrogen oxides to be removed from the exhaust gas are reacted with ammonia to form nitrogen and water. The ammonia used as reducing agent can be made available by introduction of a compound which can be decomposed to form ammonia, for example urea, ammonium carbamate or ammonium formate, into the exhaust gas train and subsequent hydrolysis. In addition, exhaust gas purification concepts for motor vehicles, in which ammonia is generated as secondary emission over a preceding catalyst, for example a nitrogen oxide storage catalyst, during a rich operating phase of the engine and is temporarily stored in the SCR catalyst until it is used during the lean operating phases, are also known.

Use in a discontinuously operating SCR system in which the ammonia used as reducing agent is generated exclusively as secondary emission in the exhaust gas system requires SCR catalysts whose ammonia storage capacity is sufficient to store, during the lean phase, virtually the entire reducing agent requirement for removal of nitrogen oxides from the exhaust gas. Zeolite-based SCR catalysts as are known from numerous publications and patent applications are particularly suitable for this purpose. For example, U.S. Pat. No. 4,961,917 describes a method of reducing nitrogen oxides by means of ammonia using a catalyst which contains a zeolite having defined properties together with iron and/or copper as promoter. Further SCR catalysts based on transition metal-exchanged zeolites and selective catalytic reduction processes using such SCR catalysts are described, for example, in EP 1 495 804 A1, U.S. Pat. No. 6,914,026 B2 or EP 1 147 801 B1.

For use in exhaust gas purification systems having introduction facilities for urea or other compounds which can be decomposed to form ammonia, which allow continuous supply of reducing agent to the system, it is not necessary for the SCR catalyst to have a large ammonia storage capacity. Accordingly, efforts are made to avoid the use of zeolite-based SCR catalysts since these are very expensive because of the high production costs for zeolite compounds.

For this purpose, SCR catalysts containing vanadium oxide together with titanium dioxide or tungsten oxide or mixtures thereof are suitable. For example, EP 0 385 164 B1 describes a catalyst of this type which contains titanium dioxide together with at least one oxide of tungsten, silicon, boron, aluminum, phosphorus, zirconium, barium, yttrium, lanthanum or cerium and also at least one oxide of vanadium, niobium, molybdenum, iron or copper and is produced as shaped body by pressing or extrusion of the components, optionally after addition of suitable auxiliaries. EP 1 153 648 A1 describes a structured SCR catalyst which contains a reduction coating whose composition corresponds to the formulation known from EP 0 385 164 B1 under a hydrolysis catalysis coating. EP 0 246 859 describes an SCR catalyst which contains vanadium applied to a mixture of cerium oxide and aluminum oxide.

A significant problem in the use of vanadium-containing SCR catalysts for purification of the exhaust gases from motor vehicles is the possible emission of volatile, toxic vanadium compounds at relatively high exhaust gas temperatures, as a result of which adverse effects on human beings and the environment have to be expected. Accordingly, the acceptance of vanadium-containing automobile exhaust gas catalysts on the market is decreasing. Efforts to provide inexpensive vanadium-free SCR catalysts have been made for a relatively long time. Thus, some mixed oxide compositions based on cerium-zirconium mixed oxide and their use in the SCR reaction are already known in the prior art.

WO 2008/049491 discloses homogeneous cerium-zirconium mixed oxides which contain 10-90% by weight of cerium oxide based on the total weight of the cerium-zirconium mixed oxide and have been activated for the SCR reaction by introduction of sulfur or a transition metal selected from the group consisting of chromium, molybdenum, tungsten or mixtures thereof or by means of combinations thereof. Particularly preferred embodiments of these mixed oxides contain from 0.02 to 3% by weight of sulfur and/or from 5 to 15% by weight of molybdenum or tungsten and from 0.5 to 3% by weight of iron or copper, in each case based on the total weight of the cerium-zirconium mixed oxide. To prepare the SCR-active compounds, particular preference is given to using cerium-zirconium mixed oxides containing 45-55% by weight of $CeO_2$ and 1-9% by weight of rare earth metal oxide.

EP 2 116 293 discloses a vanadium-free SCR catalyst which contains tungsten oxide $WO_3$ and a homogeneous cerium-zirconium mixed oxide $(Ce, Zr)O_2$, where the content of tungsten oxide $WO_3$ can be in the range from 5 to 25% by weight and the content of the homogeneous cerium-zirconium mixed oxide can be in the range from 50 to 95% by weight. Preference is given to cerium-zirconium mixed oxides having a weight ratio of cerium oxide $CeO_2$ to zirconium oxide $ZrO_2$ in the range from 0.67 to 1.5.

EP 2 072 120 likewise discloses a thermally stable catalyst for the reduction of nitrogen oxide in the presence of ammonia, which contains from 10 to 30% by weight of cerium oxide and from 5 to 14% by weight of tungsten oxide and also zirconium oxide as complex oxide.

WO 2008/051752 discloses an $NO_x$ reduction catalyst which contains a cerium-zirconium-based mixed oxide of the formula $Ce_aZr_bRcA_dM_eO_x$, where R is tungsten or manganese and A is molybdenum, tantalum or niobium, optionally also tungsten if R is manganese. M is a trivalent rare earth metal ion, preferably selected from among Sm, Gd, Dy, Er, Yb, Ho, Er, Tm and Lu, but not La or Y. The mixed oxide of the specified composition is catalytically active and is suitable for the selected catalytic reduction of nitrogen oxides by means of ammonia. It can be used in an appropriate exhaust gas after-treatment system either as substantial constituent of the catalytically active coating of an SCR catalyst or as constituent of the coating of a catalytically active particle filter.

EP 0 277 765 discloses a process for removing nitrogen oxides from the exhaust gas of diesel engines by catalytic reduction over a honeycomb catalyst containing from 60 to 95% by weight of an oxide selected from among $TiO_2$, $ZrO_2$, $(Ti, Zr)O_2$, $(Ti, Si)O_2$ and $(Ti, Zr, Si)O_2$ as active material. In addition, the catalyst contains from 0.5 to 40% by weight of vanadium oxide, tungsten oxide, molybdenum oxide, manganese oxide, cerium oxide and/or tin oxide.

U.S. Pat. No. 5,552,128 describes a process for converting nitrogen oxide into nitrogen by bringing the nitrogen oxides into contact with a reducing agent in the presence of a catalyst which effectively catalyzes the reduction of the nitrogen oxides. The catalyst consists essentially of solid acid components comprising a metal oxide of transition group 4 of the Periodic Table of the Elements which has been modified by means of an oxy anion of a metal of transition group 6 and additionally contains at least one metal selected from transition group 1, 5, 7 or 8 or main group 4 of the Periodic Table of the Elements. As examples of appropriate catalysts, the patent names zirconium oxide modified with tungstate and iron; zirconium oxide modified only with tungstate; zirconium oxide modified with tungstate and cerium; zirconium oxide modified with tungstate and nickel; zirconium oxide modified with tungstate and tin and zirconium oxide modified with tungstate, iron and manganese.

US 2006/0228283 describes a catalyst system and a process for decreasing the amount of nitrogen oxides in exhaust gases by reduction by means of hydrocarbons or oxygen-containing organic compounds. A catalyst system composed of a silver-containing catalyst and a "modifier catalyst" is used. The "modifier catalyst" contains a "modifier oxide" selected from the group consisting of iron oxide, cerium oxide, copper oxide, manganese oxide, chromium oxide, lanthanide oxides, actinide oxides, molybdenum oxide, tin oxide, indium oxide, rhenium oxide, tantalum oxide, osmium oxide, barium oxide, calcium oxide, strontium oxide, potassium oxide, calcium oxide, vanadium oxide, nickel oxide, tungsten oxide and mixtures thereof. This "modifier oxide" is applied to inorganic support oxides, where at least one is acidic and preferably selected from the group consisting of titanium-zirconium mixed oxide, zirconium-aluminum mixed oxide, sulfated zirconium oxide, phosphated zirconium oxide, tungsten-modified zirconium mixed oxide, silicon-aluminum mixed oxide, zeolite and mixtures thereof.

It is an object of the invention to provide inexpensive, vanadium-free SCR catalysts which display dynamic light-off behavior combined with an ageing-stable ammonia storage capacity and can also be produced as exhaust gas purification components having a low banking-up pressure.

It is known in the prior art that selected cerium-zirconium mixed oxides optionally doped with rare earth metal sesquioxides can, after targeted activation, display catalytic activity in respect of the selective catalytic reduction of nitrogen oxides. The inventors have now surprisingly found that the targeted association of the abovementioned mixed oxides with niobium(V) oxide ($Nb_2O_5$) leads to a mixed oxide composed of cerium oxide, zirconium oxide, rare earth metal sesquioxide and niobium oxide, which without an additional activation step displays excellent activity combined with high ageing stability in the SCR reaction.

Such mixed oxides are described in U.S. Pat. No. 6,468,941 B1, but there they are not used for the catalysis of the selective catalytic reduction of nitrogen oxides but instead as materials which conduct oxygen ions or store oxygen in three-way catalysts.

The present invention accordingly provides for the use of a catalytically active mixed oxide consisting of cerium oxide, niobium oxide, rare earth metal sesquioxide and zirconium oxide for the selective catalytic reduction of nitrogen oxides.

The use according to the invention is carried out, for example, with the mixed oxide being present in the form of a fully extruded, catalytically active honeycomb body in a catalyst. In particular, however, the use according to the invention is carried out with the mixed oxide being present in a catalytically active coating applied to a catalytically inert support body which, together with the coating, forms a catalyst.

The mixed oxide used according to the invention can be prepared by very simple means. Thus, a suitable complex mixed oxide is obtained, for example, by impregnation of a commercially available cerium-zirconium mixed oxide doped with rare earth metal sesquioxide for stabilization with an aqueous solution of a water-soluble niobium compound and subsequent calcination of the resulting (moist) powder.

Preferred mixed oxides which are to be used according to the invention and are very suitable for catalyzing the selective reduction of nitrogen oxides in lean exhaust gases have the following composition of their components, calculated as proportions by weight of the primary oxides: 15-50% by weight of $CeO_2$, 3-25% by weight of $Nb_2O_5$, 3-10% by weight of $RE_2O_3$ and $ZrO_2$ as balance, where RE is a rare earth element. The mixed oxides particularly preferably contain 25-45% by weight of $CeO_2$, 3-20% by weight of $Nb_2O_5$, 3-10% by weight of $RE_2O_3$ and $ZrO_2$ as balance and very particularly preferably 35-40% by weight of $CeO_2$, 10-15% by weight of $Nb_2O_5$, 3-6% by weight of $RE_2O_3$ and $ZrO_2$ as balance. Preferred rare earth metal sesquioxides $RE_2O_3$ are rare earth metal sesquioxides of yttrium, of ytterbium, of lanthanum, of praseodymium (as $Pr_6O_{11}$=4 $PrO_2.Pr_2O_3$) of neodymium, of samarium, of terbium and of erbium. Particular preference is given to using yttrium sesquioxide $Y_2O_3$ and neodymium sesquioxide $Nd_2O_3$.

For use in catalytic exhaust gas purification in, for example, motor vehicles having an internal combustion engine operated predominantly under lean conditions, the mixed oxides to be used according to the invention are, for example, processed to form a mechanical stable catalyst.

Preferred embodiments of such a catalyst are obtained by applying at least one catalytically active coating containing the mixed oxide to be used according to the invention to a catalytically inert support body. As catalytically inert support bodies, preference is given to using ceramic or metallic flow-through honeycomb bodies, ceramic wall flow filter substrates and ceramic or metallic foam structures. Furthermore, preferred embodiments of the catalyst are obtained when a catalytically active, monolithic honeycomb body is produced by extruding the mixed oxide to be used according to the invention. These embodiments display a particularly low banking-pressure. They are produced by producing an extrudable, paste-like composition which contains the catalytically active composition optionally together with extrusion aids such a bentonite, boehmite, γ-aluminum oxide, zirconium oxide or conventional cerium-zirconium mixed oxide. Both processes for coating catalytically inert support bodies and processes for producing catalytically active, monolithic honeycomb bodies by extrusion are prior art and known to those skilled in the art.

The catalysts produced in this way display excellent $NO_x$ conversions in the temperature range from 250° C. to 450° C. In particular, they display excellent ageing stability under hydrothermal conditions.

A further property of these catalysts which is of particular importance for their use for purifying the exhaust gases from motor vehicles having an internal combustion engine operated predominantly under lean conditions is the high thermal stability of their ammonia storage capacity. Although they have an ammonia storage capacity which is at least 30% below that of zeolite-based SCR catalysts, so that they are less preferred for use in passive SCR processes, in which the ammonia used as reducing agent is generated as secondary emission only during selected operation states over suitable, upstream catalysts, this low ammonia storage capacity which is nevertheless completely suitable for active SCR processes is exceptionally stable to thermal or hydrothermal ageing. The combination of these properties results in a dynamic light-off behavior of the catalyst in the SCR reaction after introduction of the reducing agent from a source independent of the engine (e.g. in the form of urea injection into the exhaust gas train) in all important operating states. The strategy for introduction of the reducing agent can thereby be made significantly simpler than in the case of the systems of the prior art in which, for example, exclusively zeolite-based SCR catalysts are used.

If a higher-capacity ammonium store or a widening of the activity temperature range of the above-described catalyst is required in the specific application, the mixed oxide to be used according to the invention can be employed in combination with a zeolite compound and/or a zeolite-like compound. The present invention accordingly also provides a catalytically active composition comprising (i) a mixed oxide consisting of cerium oxide, niobium oxide, rare earth metal sesquioxide and zirconium oxide and (ii) a zeolite compound and/or a zeolite-like compound containing exchangeable cations selected from the group consisting of $H^+$, $NH_4^+$, $Fe^{2+}$, $Fe^{3+}$, $Cu^+$, $Cu^{2+}$, $Ag^+$ and mixtures thereof.

The present invention additionally provides a catalyst which is characterized in that it contains (i) a mixed oxide consisting of cerium oxide, niobium oxide, rare earth metal sesquioxide and zirconium oxide and (ii) a zeolite compound and/or a zeolite-like compound containing exchangeable cations selected from the group consisting of $H^+$, $NH_4^+$, $Fe^{2+}$, $Fe^{3+}$, $Cu^+$, $Cu^{2+}$, $Ag^+$ and mixtures thereof.

Preferred catalytically active compositions according to the invention and preferred catalysts according to the invention contain the mixed oxides indicated as preferred or particularly preferred above.

The zeolite compound and/or the zeolite-like compound particularly preferably contains $H^+$, Fe and/or Cu cations. The zeolite compound and/or the zeolite-like compound itself is preferably selected from the group consisting of beta zeolite, USY, ZSM-5, CHA, FER, ERI, SAPO-11, SAPO-17, SAPO-34, SAPO-56, ALPO-11, ALPO-17, ALPO-34 and ALPO-56. Particular preference is given to to beta zeolite, CHA, FER and SAPO-34.

In an embodiment of the catalyst of the invention, the mixed oxide consisting of cerium oxide, niobium oxide, rare earth metal sesquioxide and zirconium oxide is in the form of a fully extruded, catalytically active honeycomb body and the zeolite compound and/or zeolite-like compound is present in a catalytically active coating applied to the honeycomb body.

In a further embodiment of the catalyst of the invention, the catalyst is present as a coated inert support body, with the mixed oxide being present in at least one catalytically active coating applied thereto and the zeolite compound and/or the zeolite-like compound being present in a further, physically separate, catalytically active coating.

Figure 1:
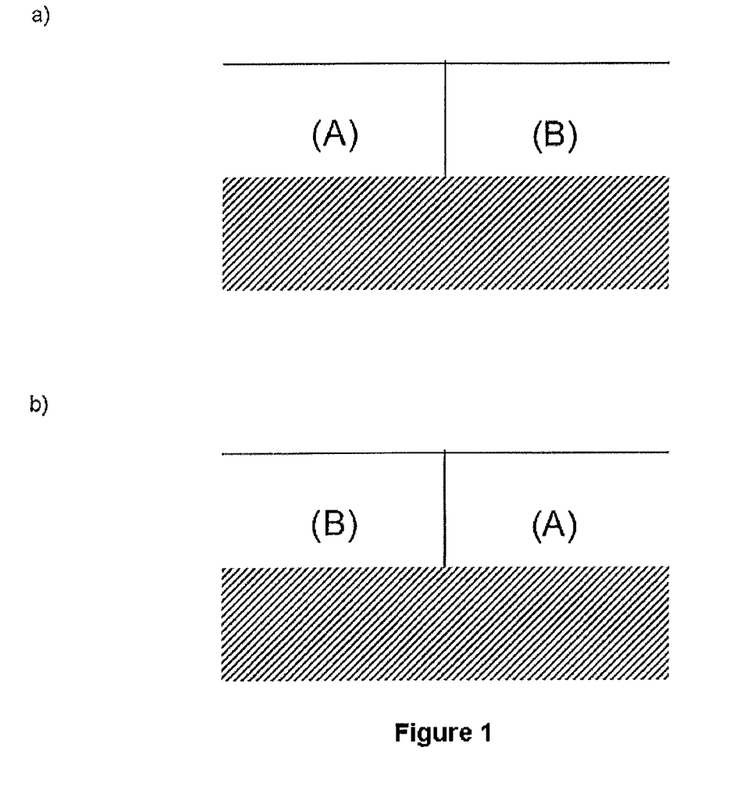
FIG. 1: Embodiments of zone catalysts according to the invention, where (A) is the catalytically active coating which contains the composition composed of cerium oxide, zirconium oxide, rare earth metal sesquioxide and niobium oxide while (B) is a physically separate, catalytically active coating containing a zeolite compound and/or a zeolite-like compound; a section of a monolithic flow-through honeycomb body whose flow channels are separated by gas-impermeable walls to which the catalytically active coatings (A) and (B) have been applied is shown schematically.

Depending on the target application, it can be particularly advantageous to use "zone catalysts" in which the catalytically active coatings are configured as zones which follow one another horizontally in the flow direction of the exhaust gas on the support body (FIG. 1). However, if operating and use conditions of the catalyst alter, it may be preferable to employ "layer catalysts" in which the catalytically active coatings are arranged as layers superposed vertically over the entire length of the component on the support body (FIG. 2).

Which specific embodiment of the catalyst is to be selected in order to achieve a very optimal exhaust gas purification result depends, as mentioned above, on the operating conditions of the catalyst in the target use and should be established after evaluation by a person skilled in the art using the standard methods known to such a person. FIGS. 1 and 2 show embodiments in which (A) is the coating containing the mixed oxide composition according to the invention while (B) is the physically separately applied coating containing the zeolite compound and/or the zeolite-like compound.

Figure 2:
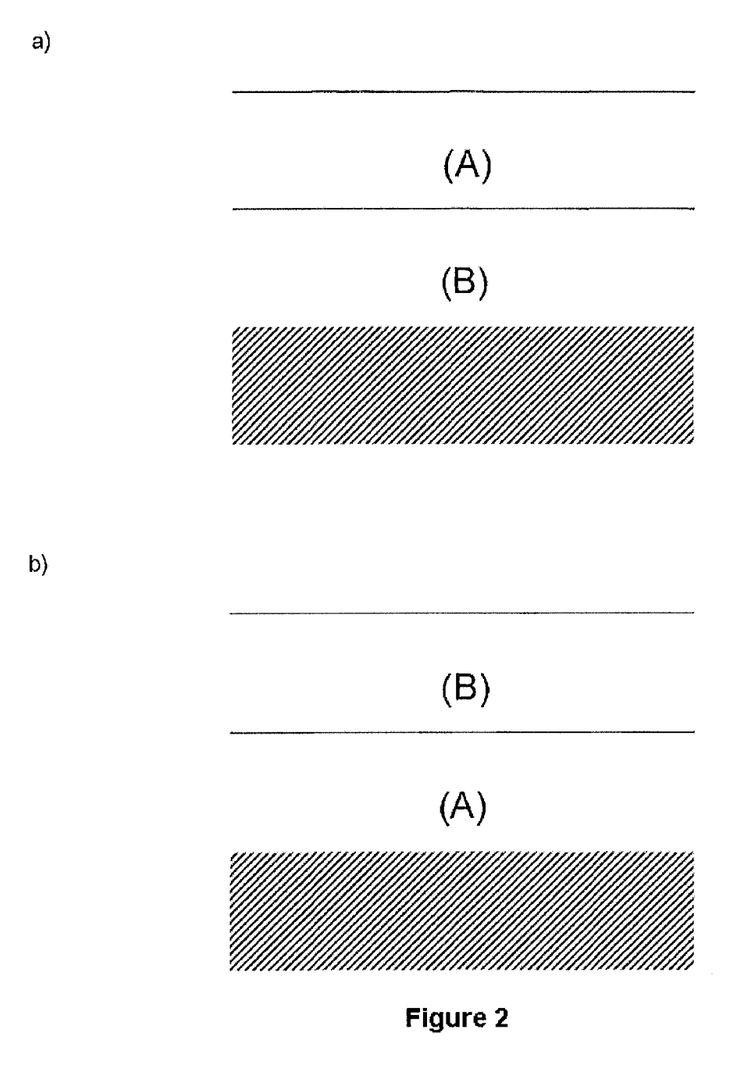
FIG. 2: Embodiments of layer catalysts according to the invention, where (A) is the catalytically active coating which contains the composition composed of cerium oxide, zirconium oxide, rare earth metal sesquioxide and niobium oxide while (B) is a physically separate, catalytically active coating containing a zeolite compound and/or a zeolite-like compound; a section of a monolithic flow-through honeycomb body whose flow channels are separated by gas-impermeable walls to which the catalytically active coatings (A) and (B) have been applied is shown schematically.

Embodiments corresponding to FIG. 1a) or FIG. 2a), in which the coating containing the mixed oxide composition comes into contact with the inflowing exhaust gas first, are preferably used in applications having a medium operating temperature in which dynamic light-off behavior and rapid "lighting" of the SCR catalyst is of particular importance. Such an arrangement of the coatings enables the maximum $NO_x$ conversion characteristic of the particular operating temperature in the SCR reaction to be achieved in the shortest time. The next zone in the flow direction of the exhaust gas or layer (B) containing the zeolite compound and/or the zeolite-like compound serves in such applications especially to store ammonia which has not been reacted in the first zonal layer and make it available for reduction of nitrogen oxides breaking through the first zone or layer in operating states having particularly high amounts of $NO_x$ and/or low characteristic $NO_x$ conversions and also to catalyze the appropriate reaction.

Embodiments according to FIGS. 1b) and 2b) in which the coating containing the zeolite and/or the zeolite-like compound is contacted first by the inflowing exhaust gas are preferred when a high-capacity ammonium store is required in order to maintain the SCR reaction in, for example, the cold operating states (long cold start phases; low-temperature applications) in which no urea can be introduced because the exhaust gas temperature is too low. An arrangement as shown in FIG. 1b) is also preferred in arrangements in which the SCR catalyst is exposed to very high exhaust gas temperatures. In this case, the coating, which usually contains ageing-stable zeolite compounds and displays relatively low tendencies to overoxidize ammonia, is arranged in the hotter inflow-end zone, while the outflow-end zone serves for completing the SCR reaction.

If the catalytically active composition of the invention is in the form of a coating on a catalytically inert support body, it can be advantageous to add a binder to the coating in order to ensure improved adhesion of the catalytically active coating to the catalytically inert support body. This applies particularly when metallic support bodies are used. The binder is preferably selected from the group consisting of aluminum oxide, zirconium oxide and silicon dioxide. Silicon dioxide is used in particular in the form of silica sol.

The mixed oxide of cerium oxide, zirconium oxide, rare earth metal sesquioxide and niobium oxide to be used according to the invention or the catalytically active composition according to the invention which additionally contains a zeolite compound and/or a zeolite-like compound is particularly suitable for the selective catalytic reduction of nitrogen oxides. The catalysts which can be produced therefrom in the manner described are particularly well suited to the purification of exhaust gases from internal combustion engines operated predominantly under lean conditions, as are used, for example, in motor vehicles (diesel vehicles, petrol vehicles operated predominantly under lean conditions). The preferred field of use of these catalysts is the selective catalytic reduction of nitrogen oxides in the exhaust gas from internal combustion engines operated predominantly under lean conditions after addition of ammonia as reducing agent to the exhaust gas to be purified, optionally in the form of a compound which can be decomposed to form ammonia.

The invention is illustrated below with the aid of some figures and examples. The figures show.

EXAMINATION OF THE NITROGEN OXIDE CONVERSION AS A MEASUREMENT OF THE SCR ACTIVITY

The mixed oxide compositions prepared in the examples and comparative examples described below were suspended in water, milled and applied in a wall thickness of 0.17 mm to a ceramic honeycomb body having a volume of 0.5 l and a cell count of 62 cells per square centimeter. After calcination of the honeycomb body at 500° C. for 2 hours in air, cylindrical drill cores were cut from the coated honeycomb body for testing in a model gas plant having a diameter of 25.4 mm and a length of 76.2 mm.

Testing was carried out in a laboratory model gas plant under the following conditions.

| Composition of the model gas | |
|---|---|
| NO [ppm by volume]: | 500 |
| $NH_3$ [ppm by volume]: | 450 |
| $O_2$ [% by volume]: | 5 |
| $H_2O$ [% by volume]: | 1.3 |
| $N_2$: | Balance |
| General test conditions | |
| Space velocity [$h^{-1}$]: | 30 000 |
| Temperature [° C.]: | 500; 450; 400; 350; 300; 250; 200; 175; 150 |
| Conditioning before commencement of measurement: | Model gas atmosphere; 600° C.; a few minutes |

During the measurement, the nitrogen oxide concentrations of the model exhaust gas downstream of the catalyst were determined by means of a suitable analytical method. From the known, introduced nitrogen oxide contents, which were verified during conditioning by means of pre-catalyst exhaust gas analysis at the beginning of the respective test run, and the measured nitrogen oxide contents downstream of the catalyst, the nitrogen oxide conversion, based on the ratio of $NH_3$ to NO, over the catalyst for each temperature measurement point was calculated as follows:

$$Conv_{NO_x} [\%] = \left[\left(1 - \frac{c_{Outlet}(NO_x)}{c_{Inlet}(NO_x)}\right) \cdot 100\right] \cdot \frac{1}{0.9}$$

where $$c_{Inlet/Outlet}(NO_x) = c_{In/Out}(NO) + c_{In/Out}(NO_2) \ldots$$

The nitrogen oxide conversion values $C_{NO_x}$ [%] obtained were plotted as a function of the temperature measured upstream of the catalyst in order to assess the SCR activity of the materials examined.

Example 1

A commercially available cerium-zirconium mixed oxide having a weight ratio of $CeO_2$: $ZrO_2$ of 1:1.1 and an $Nd_2O_3$ content of 5.3% by weight was impregnated with an aqueous solution of ammonium niobium oxalate and calcined at 500° C. for 2 hours. The resulting mixed oxide composition according to the invention consisted of 38% by weight of $CeO_2$, 14.5% by weight of $Nb_2O_5$, 4.5% by weight of $Nd_2O_3$ and 43% by weight of $ZrO_2$.

A coating suspension was made up from the mixed oxide and a catalytically inert honeycomb body was coated therewith. Three drilled cores were taken from the catalyst produced in this way. The catalytic activity in the freshly produced state was measured on the first drill core (K1(f)) in accordance with the above-described test routine. A second drill core (K1(A-1)) was treated thermally at 750° C. for 16 hours in a furnace in an atmosphere containing 10% by volume of oxygen and 10% by volume of steam in nitrogen before examination of the catalytic activity. A third drill core (K1(A-2)) was likewise treated thermally before examination of the catalytic activity. However, this was subjected to thermal ageing matched to SCR use in a diesel vehicle, i.e. a thermal treatment at 600° C. for 200 hours in an oven through which 10% by volume of oxygen and 10% by volume of steam in nitrogen flowed (average space velocity: 2 200 h$^{-1}$).

Figure 3:
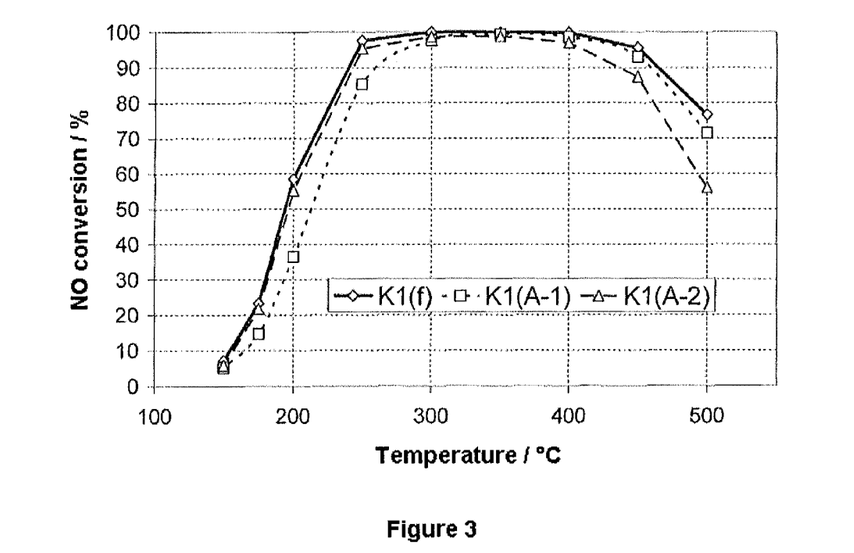
FIG. 3: Nitrogen oxide conversions in the SCR reaction, measured over a composition composed of 38% by weight of $CeO_2$, 14.5% by weight of $Nb_2O_5$, 4.5% by weight of $Nd_2O_3$ and 43% by weight of $ZrO_2$ in the freshly produced state (K1(f)), after ageing at 750° C./16 h (K1(A-1)) and after ageing at 600° C./200 h (K1(A-2)).

FIG. 3 shows the results of the catalytic activity tests. In the freshly produced state, the catalyst according to the invention shows a nitrogen oxide conversion of more than 97% at as low as 250° C. In the temperature range from >250° C. to 400° C., the nitrogen oxides were reacted completely. Only above 450° C. did a slight decrease in the conversion occur. The conversion curves of the thermally pretreated drill cores additionally show that the catalyst of the invention has a very, very great ageing stability. After the abbreviated ageing at high temperatures (750° C.; K1(A-1)), the catalyst suffers a conversion decrease in the low-temperature range up to 250° C. and achieves complete NO$_x$ conversion only above 300° C. After longer ageing at lower temperatures (K1(A-2)), on the other hand, virtually no decrease in conversion as a result of thermal ageing is observed in the low-temperature range up to 400° C. Ageing of the catalyst under these conditions is discernible only in terms of a more rapid drop in the NO$_x$ conversion curve in the high-temperature range above 400° C.

Example 2

Using a procedure analogous to that indicated in example 1, a mixed oxide having the following composition was obtained: 38% by weight of CeO$_2$, 14.5% by weight of Nb$_2$O$_5$, 4.5% by weight of Y$_2$O$_3$ and 43% by weight of ZrO$_2$.

A coating suspension was made up from the mixed oxide as indicated in example 1 and a catalytically inert honeycomb body was coated therewith.

The catalyst obtained in this way will hereinafter be designated as K2.

As indicated in example 1, a second drill core (K2(A-1)) was in this case also treated thermally at 750° C. for 16 hours in a furnace in an atmosphere containing 10% by weight of oxygen and 10% by weight of steam in nitrogen before examination of the catalytic activity.

The catalytic performance of the catalysts according to the invention as per examples 1 and 2 in the SCR reaction was compared with two catalysts from the prior art:

Comparative Example 1

A commercial SCR catalyst based on vanadium oxide and containing a catalytically active coating consisting of V$_2$O$_5$, WO$_3$, TiO$_2$ and SiO$_2$ was selected as first comparative catalyst.

Two drill cores were taken from the commercial catalyst, and of these one drill core was tested in the freshly produced state (CK1(f)), while the second drill core (CK1(A-2)) was subjected to thermal pretreatment at 600° C. for 200 hours in a furnace through which 10% by volume of oxygen and 10% by volume of steam in nitrogen flowed (average space velocity: 2 200 h$^{-1}$) before testing.

Comparative Example 2

A second comparative catalyst containing a catalytically active coating consisting of 15% by weight of WO$_3$, 46.75% by weight of ZrO$_2$, 27.2% by weight of CeO$_2$, 5.1% by weight of Y$_2$O$_3$ and 5.95% by weight of Nb$_2$O$_3$ on a catalytically inert honeycomb body was produced as described in WO 2008/051752.

Two drill cores were likewise taken from the catalyst, of which one drill core was tested in the freshly produced state (CK2(f)), while the second drill core (CK2(A-1)) was treated thermally at 750° C. for 16 hours in a furnace in an atmosphere containing 10% by volume of oxygen and 10% by volume of steam in nitrogen before testing.

Figure 4:
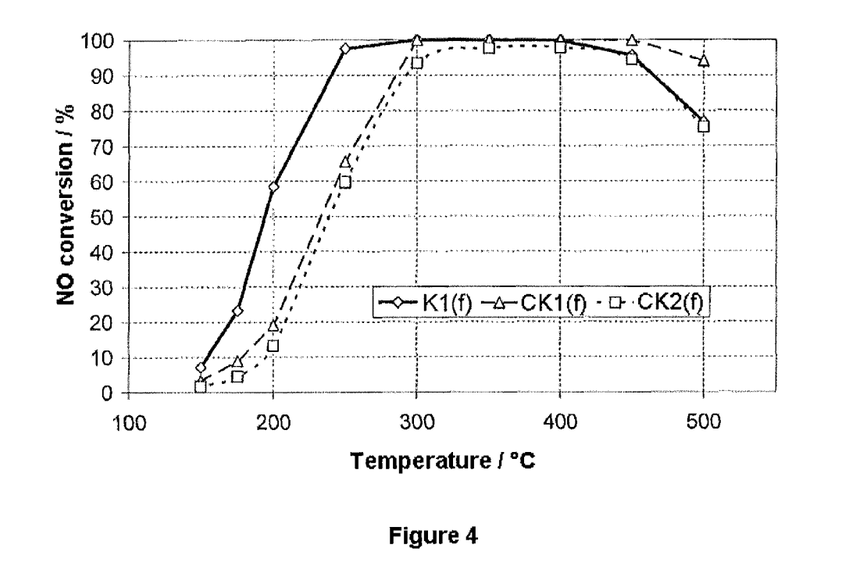
FIG. 4: Nitrogen oxide conversions in the SCR reaction over a catalyst K1(f), a commercial vanadium oxide-based SCR catalyst CK1(f) and a comparative catalyst CK2(f) as described in WO 2008/051752 in the freshly prepared state.

FIG. 4 shows a comparison of the NO$_x$ conversion performances of the freshly produced catalysts K1(f), CK1(f) and CK2(f). The catalyst according to the invention shows the largest working temperature range with complete NO$_x$ conversion in the range from >250 to 400° C. In addition, the catalyst according to the invention shows by far the best NO$_x$ conversion performance in the low-temperature range up to 250° C. In the temperature range above 450° C., there is a distinct "downward kink" in the NO$_x$ conversion curve—a reaction behavior which corresponds to that of the comparative catalyst as per WO 2008/051752 (CK2(f)).

Figure 5:
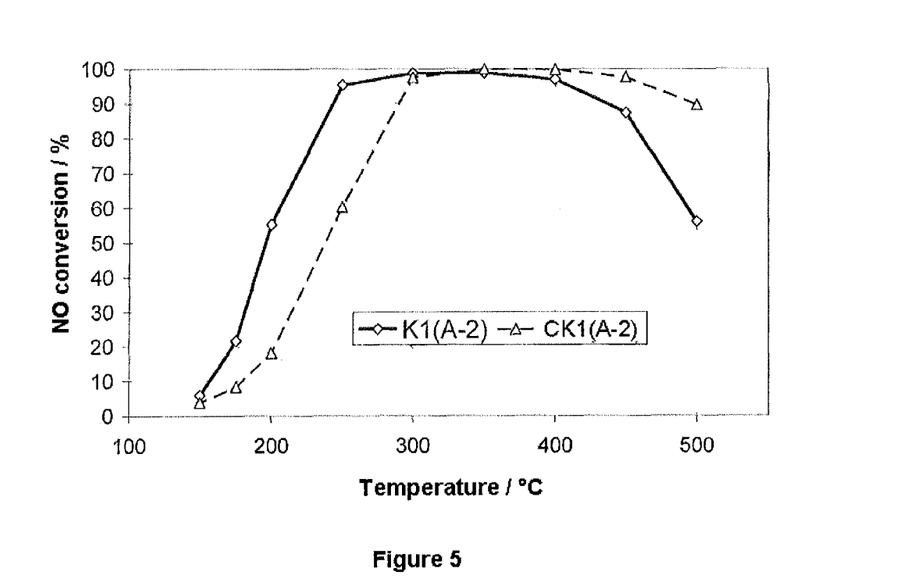
FIG. 5: Nitrogen oxide conversions in the SCR reactions over a catalyst K1(A-2) and a commercial vanadium oxide-based catalyst CK1(A-2), both after thermal pretreatment at 600° C. for 200 hours.

FIG. 5 shows a comparison of the catalyst according to the invention K1(A-2) aged at 600° C. (200 hours) with the vanadium oxide-based, commercial catalyst aged under corresponding conditions. Comparison of the conversion performances after ageing shows that the working temperature range of the catalyst according to the invention after ageing is shifted by about 50° to lower temperatures, i.e. a considerably better NO$_x$ conversion is achieved in the low-temperature range up to 300° C. and more rapid attainment of full conversion is observed together with somewhat earlier deterioration in the conversion.

Figure 6:
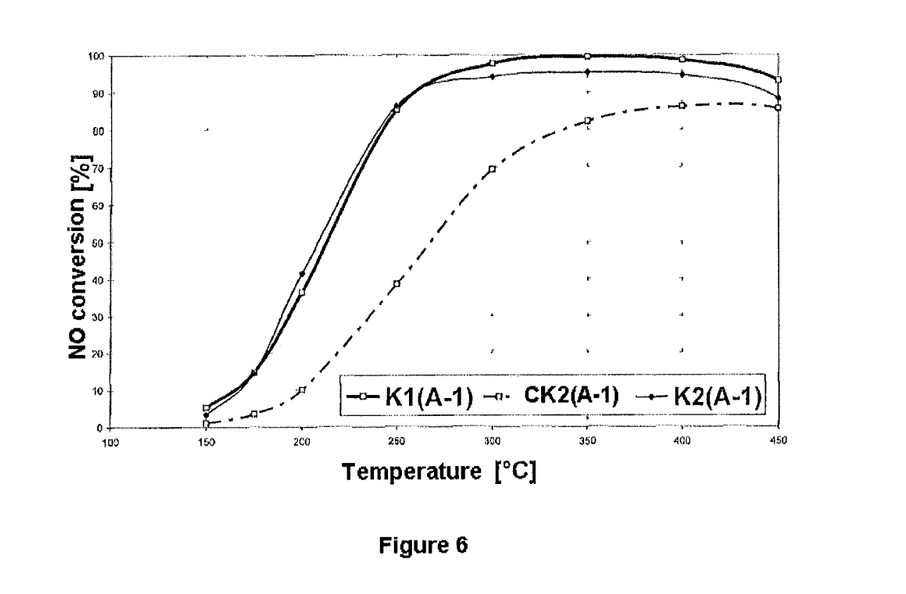
FIG. 6: Nitrogen oxide conversions in the SCR reaction over the catalysts K1(A-1) and K2(A-1) and also a comparative catalyst CK2(A-1) as described in WO 2008/051752, or after thermal pretreatment at 750° C. for 16 hours.

FIG. 6 shows a comparison of the catalysts according to the invention K1(A-1) and K2(A-1) aged at 750° C. (16 hours) with the correspondingly aged comparative catalyst CK2(A-1) as per WO 2008/051752. While the activity of the comparative catalyst as per WO 2008/051752 has deteriorated significantly (max. 86% NO$_x$ conversion at 400° C.), the catalysts according to the invention still achieve NO$_x$ conversions close to 100% or over 95% even after this hot thermal treatment in the temperature range from 300 to 400° C.

The measurements show that the catalysts according to the invention have considerably improved properties both compared to commercial vanadium oxide-based SCR catalysts and compared to vanadium-free mixed oxide compositions according to the prior art. This applies particularly in respect of the achievable NO$_x$ conversions, the breadth of the working temperature range in which virtually complete conversion is achieved and in respect of the thermal ageing stability of the catalyst.

Comparative Example 3

A commercially available SiO$_2$ binder and a commercially available boehmite binder as coating auxiliaries and iron(III) nitrate nonahydrate and commercially available β-zeolite having a molar SiO$_2$/Al$_2$O$_3$ ratio (SAR) of 25 were suspended in water and applied in an amount of 222 g/l to a ceramic flow-through honeycomb body having 62 cells per square centimeter and a cell wall thickness of 0.17 millimeters by a conventional dipping process. The coated component was firstly calcined at 350° C. for 15 minutes, then at 500° C. for 2 hours. The coating comprised 90% of β-zeolite and had an iron content, calculated as $Fe_2O_3$, of 4.5% by weight.

The catalyst obtained in this way will be designated as CK3 below.

As indicated in example 1, a second drill core (CK3(A-1)) was in this case also treated thermally at 750° C. for 16 hours in a furnace in an atmosphere containing 10% by volume of oxygen and 10% by volume of steam in nitrogen before examination of the catalytic activity.

Example 3

A layer catalyst as shown in FIG. 2a) was produced. For this purpose, a catalyst obtained in a manner analogous to comparative example 3 (applied amount 150 g/l instead of 222 g/l) was provided with an additional coating by applying a coating suspension as per example 1 in an amount of 70 g/l again by means of a conventional dipping process and calcining as indicated.

The layer catalyst obtained in this way is designated as K3 below.

As indicated in example 1, a second drill core (K3(A-1)) was in this case also treated thermally at 750° C. for 16 hours in a furnace in an atmosphere containing 10% by volume of oxygen and 10% by volume of steam in nitrogen before examination of the catalytic activity.

The thermal stability of the $NH_3$ storage capacity of K3 compared to CK3 was determined as follows:

The test was carried out on supported catalysts in a laboratory model gas plant. The following test gas compositions were used:

| Constituent | Phase | | | | | |
| --- | --- | --- | --- | --- | --- | --- |
| | 1 | 2 | 3 | 4 | 5 | 6 |
| $O_2$ [% by volume]: | 5 | 5 | 5 | 5 | 5 | 5 |
| NO [vppm]: | 500 | 0 | 0 | 0 | 0 | 500 |
| $NH_3$ [vppm]: | 0 | 0 | 450 | 0 | 0 | 0 |
| $H_2O$ [vppm]: | 5 | 5 | 5 | 5 | 5 | 5 |
| $N_2$ [% by volume]: | Balance | Balance | Balance | Balance | Balance | Balance |
| Space velocity [$h^{-1}$] | 30000 | 30000 | 30000 | 30000 | 30000 | 30000 |
| Temperature [° C.] | 600 | 600—Target | Target | Target | Target—600 | 600 |

Before the test, a feed gas measurement is carried out in a bypass. At the same time, the reactor is heated to 600° C. The gas mixture is then switched over to the reactor and passes through the above-described phases 1 to 6. A total of three different target temperatures were employed: 400° C., 300° C. and 200° C. The total test proceeds as follows:
Phase 1: Empty storage, hold time 10 min (600° C.)
Phase 2: Cooling to target temperature (10 K/min), hold time 5 min
Phase 3: =$NH_3$ adsorption phase, hold time 20 min
Phase 4: =$NH_3$ desorption phase: switch off $NH_3$, hold time 20 min
Phase 5: =Heating to 600° C.
Phase 6: =Empty storage: switch in NO, hold time 10 min Repetition of phases 2 to 6 until the last temperature point. Then switch gas mixture to bypass, recording of a second feed gas measurement.

At the end of the hold time in phase 3, the concentration which leaves the filled storage of the catalyst is determined: $c(NH_3)_{Ph3,end}$. The amount of $NH_3$ stored at any point in time t is given by the difference between $c(NH_3)_{Ph3}$,end and the amount of $NH_3$ detected downstream of the catalyst $c(NH_3)_{Ph3,t}$:

$$\Delta c(NH_3)_{Ph3,t} = c(NH_3)_{Ph3,end} - c(NH_3)_{Ph3,t}$$

The integral of the plot $\Delta c(NH_3)_{Ph3,t}$ against time t for phase 3 gives, after appropriate conversion of the concentration $c(NH_3)$ into the mass $m(NH_3)$, the total storage capacity $m(NH_3)$ [mg/l of cat] for the temperature point under consideration.

The $NH_3$ storage capacity of the catalyst drill cores examined is determined both in the fresh (f) and the aged state (A-1). As a measure of the thermal stability of the $NH_3$ storage capacity, the difference in the $NH_3$ storage capacities determined by means of the above test is determined from each measured temperature:

$$\Delta m(NH_3) = m(NH_3)_{fresh} - m(NH_3)_{aged}$$

Figure 7:
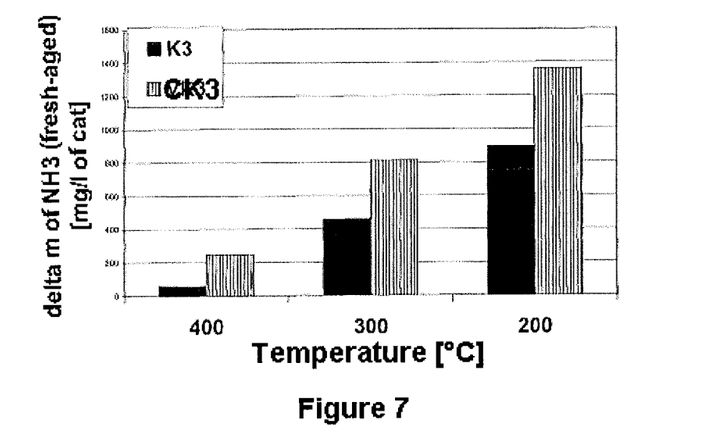
FIG. 7: Difference in the $NH_3$ storage capacity between the fresh catalyst K3(f) and its thermally pretreated version which has been heated at 750° C. for 16 hours (K3(A-1)) compared to CK3 (f)/CK3(A-1).

FIG. 7 shows the $\Delta m$ values obtained at 200, 300 and 400° C. for K3 and CK3. As indicated above, K3 displays a significantly better thermal stability of the $NH_3$ storage capacity compared to CK3 at all temperatures.

Example 4

A layer catalyst as shown in FIG. 2b) was produced. For this purpose, the coating described in example 2 was applied in an amount of 70 g/l to a ceramic flow-through honeycomb body have 62 cells per square centimeter and a cell wall thickness of 0.17 millimeters by a conventional dipping process and calcined as described in example 3.

A suspension containing an iron-containing 13-zeolite was then applied in an amount of 150 g/l to this coating by means of a conventional dipping process, dried and calcined as indicated in comparative example 3.

To produce the suspension containing an iron-containing β-zeolite, a commercially available Fe-beta-zeolite containing 1.3% of $Fe_2O_3$ and having an SAR=40 was suspended together with $Al_2O_3$ and $SiO_2$-based binders as auxiliaries (0.8% of AlOOH (boehmite), 4% of $SiO_2$ (amorphous), 9% of $SiO_2$ (sol)) in water.

Example 5

A zone catalyst as shown in FIG. 1a) was produced. For this purpose, the coating described in example 2 was, in a first working step, applied in an amount of 200 g/l to a ceramic flow-through honeycomb body having cells per square centimeter and a cell wall thickness of 0.17 millimeters by a conventional dipping process, but only for 50% of its length starting from the inlet end face of the honeycomb body.

In a second working step, the coating suspension described in comparative example 4 was applied by a conventional dipping process, but to 50% of the length of the honeycomb body starting from the outlet end face of the honeycomb body, i.e. up to the coating applied in the first step.

The zone catalyst obtained in this way will be designated as K5.

As indicated in example 1, a second drill core (K5(A-1)) was in this case also treated thermally at 750° C. for 16 hours in a furnace in an atmosphere containing 10% by volume of oxygen and 10% by volume of steam in nitrogen before examination of the catalytic activity.

Example 6

The process described in example 5 was repeated with the difference that, in the second working step, the coating suspension described in comparative example 3 was applied instead of the coating suspension described in comparative example 4.

The zone catalyst obtained in this way will be designated as K6.

As indicated in example 1, a second drill core (K6(A-1)) was in this case also treated thermally at 750° C. for 16 hours in a furnace in an atmosphere containing 10% by volume of oxygen and 10% by volume of steam in nitrogen before examination of the catalytic activity.

Comparative Example 4

A coating suspension was produced by suspending commercially available SAPO-34 in water and adding an aqueous copper(II) nitrate solution. The amount of the copper nitrate solution added was calculated so that the finished catalyst contained 2% by weight of Cu, based on the total weight of the exchanged zeolite-like compound. The suspension was stirred for 30 minutes to complete the ion exchange and then, after addition of silica sol as binder, applied directly to a ceramic flow-through honeycomb body which had 62 cells per square centimeter and a cell wall thickness of 0.165 millimeters and had a diameter of 92.96 millimeters and a length of 76.2 millimeters. The honeycomb body which had been coated in this way was dried at 90° C., calcined at 350° C. and heat treated at 640° C. in air for 2 hours. The catalyst obtained in this way will be designated as CK4.

As indicated in example 1, a second drill core (CK4(A-1)) was in this case also treated thermally at 750° C. for 16 hours in a furnace in an atmosphere containing 10% by volume of oxygen and 10% by volume of steam in nitrogen before examination of the catalytic activity.

The dynamic light-off behavior after introduction of $NH_3$ of the catalysts according to the invention K2(A-1) and K6(A-1) and also of the comparative catalyst CK3(A-1) was determined as follows:

The test was carried out on supported catalysts in a laboratory model gas plant. The following test gas compositions were set:

| | Gas mixture | | |
|---|---|---|---|
| Constituent | Gas mixture 1 | Gas mixture 2 | Gas mixture 3 |
| $O_2$ [% by volume]: | 10 | 10 | 10 |
| NO [vppm]: | 500 | 500 | 0 |
| $NH_3$ [vppm]: | 0 | 750 | 0 |
| CO [vppm]: | 350 | 350 | 350 |
| $C_3H_6$ [vppm]: | 100 | 100 | 100 |
| $H_2O$ [vppm]: | 5 | 5 | 5 |
| $N_2$ [% by volume]: | Balance | Balance | Balance |
| Space velocity [$h^{-1}$] | 60000 | 60000 | 60000 |

The test was carried out at various temperatures matched to the target temperature range most relevant in use for an SCR system installed downstream of other exhaust gas purification devices in an exhaust gas system, namely at 250° C., 300° C. and 350° C. At each temperature, a cycle made of four different phases, hereinafter designated as phases A to D, was carried out:

Phase A: Gas mixture 1; duration: 5 minutes;
Phase B: $NH_3$ SCR phase: gas mixture 2; duration: to $NH_3$ breakthrough of 20 vppm or termination after a given time;
Phase C: Gas mixture 3; emptying of the $NH_3$ storage by means of a temperature ramp to 500° C.;
Phase D: Gas mixture 3; setting of the mixed measurement temperature.

Within a cycle, the catalyst temperature was firstly brought to the defined target temperature. The catalyst was then supplied with gas mixture 1 for 5 minutes (phase A). In phase B, the gas supply was switched over to gas mixture 2 in order to determine the $NH_3$ SCR conversion. This phase was either stopped when an $NH_3$ breakthrough of 20 vppm was detected or according to a predetermined time criterion. Gas mixture 3 was then introduced and the catalyst was heated to 500° C. in order to empty the ammonia storage (phase C). The catalyst was subsequently cooled down to the next measurement temperature to be examined (phase D); the next cycle commenced with phase A by introduction of the gas mixture 1 after setting of the target temperature. The dynamic $NO_x$ conversion was determined upstream and downstream of the catalyst for all measurement temperatures from the concentrations of the appropriate exhaust gas components determined during phase B.

Figure 8:
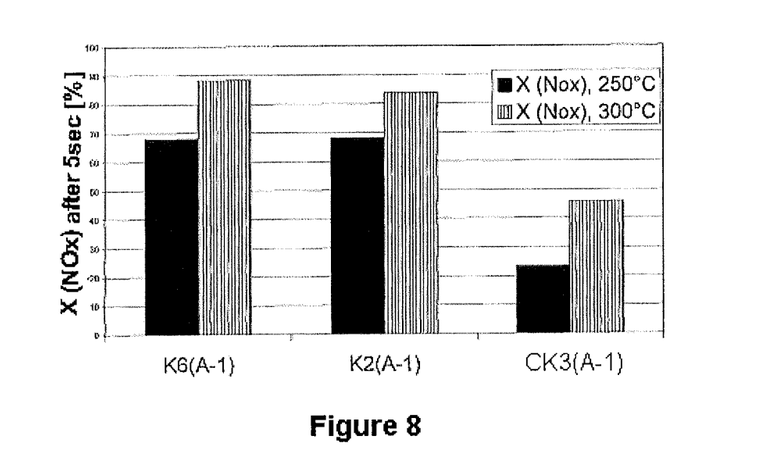
FIG. 8: Dynamic light-off behavior after introduction of $NH_3$ of the catalysts K2(A-1), K6 (A-1) and CK3(A-1), measured at 250 and 300° C.

As characteristic number for dynamic light-off behavior, the $NO_x$ conversion $X(NO_x)$ derived from the measured $NO_x$ concentration 5 seconds after commencement of phase B is calculated. FIG. 8 shows the characteristic numbers determined for K2(A-1), K6(A-1) and CK3(A-1), in each case at 250 and 300° C.

The earlier light-off behavior of the catalysts K2(A-1) and K6(A-1) according to the invention can be seen from the significantly higher $NO_x$ conversion $X(NO_x)$ compared to CK3(A-1) even after only 5 seconds.

Figure 9:
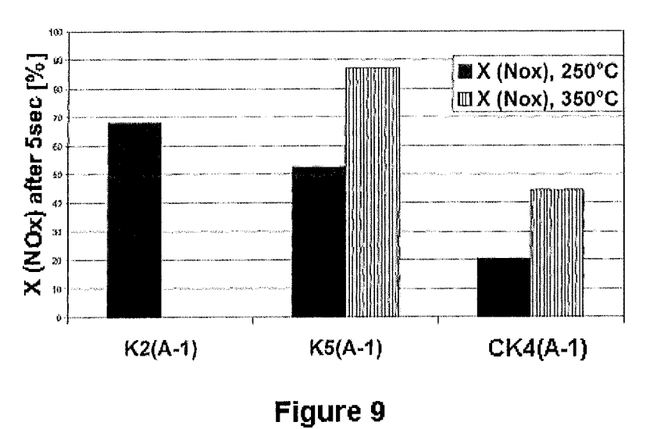
FIG. 9: Dynamic light-off behavior after introduction of $NH_3$ of the catalysts K2(A-1), K5(A-1) and CK4(A-1), measured at 250 and 350° C.

In an analogous way, the dynamic light-off behavior after introduction of $NH_3$ of the catalysts K2(A-1) and K5(A-1) according to the invention and of the comparative catalyst CK4(A-1) was determined, but the characteristic numbers were determined at 250 and 350° C. The results are shown in FIG. 9. K2(A-1) and K5(A-1) display an earlier light-off behavior compared to CK4(A-1).

The mixed oxides described in examples 7 to 13 below and catalysts containing these can also be obtained in a manner analogous to examples 1 and 2 above. They likewise display good properties as SCR catalysts:

| Example | $CeO_2$ [% by weight] | $Nb_2O_5$ [% by weight] | $RE_2O_3$/ [% by weight] | $ZrO_2$ [% by weight] |
|---|---|---|---|---|
| 7 | 38 | 14.5 | $La_2O_3$/4.5 | 43 |
| 8 | 25 | 15 | $Y_2O_3$/10 | 50 |
| 9 | 45 | 15 | $Nd_2O_3$/10 | 30 |
| 10 | 45 | 3 | $Nd_2O_3$/9 | 43 |
| 11 | 40 | 15 | $Y_2O_3$/3 | 42 |
| 12 | 35 | 10 | $Nd_2O_3$/6 | 49 |
| 13 | 50 | 20 | $Y_2O_3$/5 | 25 |

SCR catalysts having good properties are also obtained when the mixed oxide described in each of examples 3 to 6 is replaced by one of the mixed oxides of examples 7 to 13.

The invention claimed is:

1. A process for the selective catalytic reduction of nitrogen oxides, comprising reducing nitrogen oxides with a catalytically active mixed oxide consisting of cerium oxide, niobium oxide, rare earth metal sesquioxide and zirconium oxide.

2. The process as claimed in claim 1, wherein the mixed oxide consists of

| | |
|---|---|
| $CeO_2$: | 15-50% by weight; |
| $Nb_2O_5$: | 3-25% by weight; |
| $RE_2O_3$: | 3-10% by weight; |
| $ZrO_2$: | balance, | in each case calculated as primary oxides.

3. The process as claimed in claim 1, wherein the mixed oxide is present in a catalytically active coating applied to a catalytically inert support body which together with the coating forms a catalyst.

4. A catalytically active composition comprising (i) a mixed oxide consisting of cerium oxide, niobium oxide, rare earth metal sesquioxide and zirconium oxide and (ii) a zeolite compound and/or a zeolite-structured compound containing exchangeable cations selected from the group consisting of $H^+$, $NH_4^+$, $Fe^{2+}$, $Fe^{3+}$, $Cu^+$, $Cu^{2+}$, $Ag^+$, and mixtures thereof.

5. A catalyst comprising (i) a mixed oxide consisting of cerium oxide, niobium oxide, rare earth metal sesquioxide and zirconium oxide and (ii) a zeolite compound and/or a zeolite-structured compound containing exchangeable cations selected from the group consisting of $H^+$, $NH_4^+$, $Fe^{2+}$, $Fe^{3+}$, $Cu^+$, $Cu^{2+}$, $Ag^+$, and mixtures thereof.

6. The catalyst as claimed in claim 5, wherein the zeolite compound and/or the zeolite-structured compound is selected from the group consisting of beta zeolite, USY, ZSM-5, CHA, FER, ERI, SAPO-11, SAPO-17, SAPO-34, SAPO-56, ALPO-11, ALPO-17, ALPO-34 and ALPO-56.

7. The catalyst according to claim 5, wherein the catalyst is present as a coated inert support body, with the mixed oxide being present in at least one catalytically active coating applied thereto and the zeolite compound and/or the zeolite-structured compound being present in a further, physically separate, catalytically active coating.

8. The catalyst as claimed in claim 7, wherein the catalytically active coatings are configured as zones, with one following the other horizontally in the flow direction of the exhaust gas on the support body ("zone catalyst").

9. The catalyst as claimed in claim 7, wherein the catalytically active coatings are arranged as layers superposed vertically on the support body ("layer catalyst").

10. The catalyst as claimed in claim 7, wherein a binder selected from the group consisting of aluminum oxide, zirconium oxide and silicon dioxide is present in at least one catalytically active coating.

11. A process for purifying the exhaust gases of an internal combustion engine operated under predominantly lean conditions, comprising placing exhaust gases of the internal combustion engine in contact with the catalyst of claim 5.

12. A process for the selective catalytic reduction of nitrogen oxides in the exhaust gas from an internal combustion engine operated under predominantly lean conditions after addition of ammonia, optionally in the form of a compound which can be decomposed to form ammonia, as reducing agent to the exhaust gas to be purified, comprising placing the nitrogen oxides in contact with the catalyst of claim 5.

* * * * *